US009675160B2

(12) United States Patent
Jung (10) Patent No.: US 9,675,160 B2
(45) Date of Patent: Jun. 13, 2017

(54) FIXED QUANTITY DISCHARGE DEVICE FOR LIQUID CONTAINER

(71) Applicant: YONWOO CO., LTD., Incheon (KR)

(72) Inventor: Seo-Hui Jung, Incheon (KR)

(73) Assignee: YONWOO CO., LTD., Incheon (KR)

( * ) Notice: Subject to any disclaimer, the term of this patent is extended or adjusted under 35 U.S.C. 154(b) by 0 days.

(21) Appl. No.: 14/784,878

(22) PCT Filed: Apr. 16, 2014

(86) PCT No.: PCT/KR2014/003310
§ 371 (c)(1),
(2) Date: Oct. 15, 2015

(87) PCT Pub. No.: WO2014/171737
PCT Pub. Date: Oct. 23, 2014

(65) Prior Publication Data
US 2016/0058154 A1    Mar. 3, 2016

(30) Foreign Application Priority Data

Apr. 16, 2013  (KR) ........................ 10-2013-0041334

(51) Int. Cl.
*A45D 34/04*  (2006.01)
*A45D 34/00*  (2006.01)
(Continued)

(52) U.S. Cl.
CPC ............. *A45D 34/04* (2013.01); *A45D 34/00* (2013.01); *B05B 11/3045* (2013.01);
(Continued)

(58) Field of Classification Search
CPC ....... A45D 34/00; A45D 34/04; G01F 11/028; G01F 11/06; G01F 11/027; B05B 3/12;
(Continued)

(56) References Cited

U.S. PATENT DOCUMENTS 4,487,081 A * 12/1984 De Vaughn ........... B01L 3/0279
422/932
(Continued)

FOREIGN PATENT DOCUMENTS

| KR | 10-1199768 B1 | 11/2012 |
| KR | 10-1215420 B1 | 12/2012 |
| KR | 2013-0003678 A | 1/2013 |

OTHER PUBLICATIONS

International Search Report issued in PCT/KR2014/003310 dated Jul. 11, 2014.

*Primary Examiner* — Paul R Durand
*Assistant Examiner* — Andrew P Bainbridge
(74) *Attorney, Agent, or Firm* — Marshall, Gerstein & Borun LLP (57) ABSTRACT

The present disclosure relates to a fixed quantity discharge device for a liquid container, more specifically a fixed quantity discharge device for a liquid container which includes a contents suction tube extended into the inside of the container body for enabling a pipette tube to be inserted and drawn so as to make the lower end of the pipette tube be exposed to the contents, thus preventing contamination of the pipette tube, and a piston provided in the container body so as to rise as the contents are consumed, thus minimizing the residual contents in the container body.

5 Claims, 5 Drawing Sheets

(51) Int. Cl.
*B05B 11/00* (2006.01)
*B65D 47/12* (2006.01)
*B65D 83/00* (2006.01)
*G01F 11/02* (2006.01)

(52) U.S. Cl.
CPC .......... *B05B 11/3088* (2013.01); *B65D 47/12* (2013.01); *B65D 83/0005* (2013.01); *G01F 11/027* (2013.01); *G01F 11/028* (2013.01); *A45D 2200/055* (2013.01); *B05B 11/0048* (2013.01)

(58) Field of Classification Search
CPC ............. B05B 11/0048; B05B 11/0051; B05B 11/025; B05B 11/3001; B05B 11/3005; B05B 11/3007–11/3008; B05B 11/3045; B05B 11/3052; B05B 11/3069; B05B 11/308; B05B 11/3088; A61M 5/315; B01L 3/02; B01L 3/0203; B01L 3/0206; B01L 3/021; B01L 3/0217; B01L 3/0224; B01L 3/0282; B65D 47/12; B65D 47/18; B65D 83/0022; B65D 83/54; B65D 83/546; B65D 83/005
USPC ............. 222/282–288, 309, 383.1, 420–422, 222/519–523; 141/83, 113; 73/864.11, 73/864.25; 422/919–934
See application file for complete search history.

(56) References Cited

U.S. PATENT DOCUMENTS

| | | | | |
|---|---|---|---|---|
| 4,801,434 A | * | 1/1989 | Kido | B01L 3/0217 222/135 |
| 5,154,702 A | * | 10/1992 | Foyil | B01L 3/0282 215/214 |
| 5,320,810 A | * | 6/1994 | Al-Mahareeq | B01L 3/0224 422/517 |
| 7,874,461 B2 | * | 1/2011 | Bae | B05B 11/0032 222/153.11 |
| 2012/0261029 A1 | * | 10/2012 | Kim | A45D 34/04 141/23 |
| 2013/0074983 A1 | * | 3/2013 | Choi | A45D 34/04 141/23 |
| 2014/0020789 A1 | * | 1/2014 | Duquet | A45D 34/04 141/24 |
| 2015/0144663 A1 | * | 5/2015 | Noel | A45D 34/00 222/383.1 |
| 2015/0257510 A1 | * | 9/2015 | Kim | A45D 34/041 401/126 |
| 2015/0320175 A1 | * | 11/2015 | Lee | A45D 34/00 222/372 |
| 2016/0058154 A1 | * | 3/2016 | Jung | A45D 34/00 222/382 |

\* cited by examiner

FIXED QUANTITY DISCHARGE DEVICE FOR LIQUID CONTAINER

CROSS-REFERENCE TO RELATED APPLICATIONS

This U.S. utility patent application is a national stage application under 35 U.S.C. §371 of international application PCT/KR2014/003310, filed Apr. 16, 2014, and claims the benefit of priority under 35 U.S.C. §119 of Korean Patent Application No. 10-2013-0041334, filed Apr. 16, 2013, the entire contents of which are hereby incorporated herein by reference for all purposes.

TECHNOLOGICAL FIELD

The present disclosure relates to a fixed quantity discharge device for a liquid container and, more specifically, a fixed quantity discharge device for a liquid container which includes a contents suction tube extended into the inside of the container body for enabling a spuit pipe to be inserted and drawn so as to make the lower end of the spuit pipe exposed to the contents, thus preventing contamination of the spuit pipe, and a piston provided in the container body so as to ascend as the contents are being consumed, thus minimizing the residual contents in the container body.

BACKGROUND

Generally, a method used for cosmetics or liquid contents, such as an eye cream, is to use a small but fixed amount at a time, and therefore a method individually prepacking a fixed amount was used previously for each use by packing as much as to be used in one container such as a capsule. However these individual packing method had a problem that there was relatively large amount of residual remaining in the capsule, which was very inefficient.

To solve these problems in individual prepacking method, it is devised to use a discharging tool, which has a structure of ordinary spuits or injectors to suck and discharge contents contained in a container, or a discharging tool, which has a structure of a push pump, and thereby contents are drawn whenever being used.

However, in case of a discharging tool with a structure of general spuits, amount of discharged contents is variable according to the amount of pressure given by a user, and thereby problems still remain: it is not easy to discharge exactly fixed amount whenever being used.

To solve such problems described in the above, "Dispenser for liquid container" (Korean registered patent no. 10119176) has been filed by the inventor of this application, which proposed a structure that can discharge a fixed amount of contents.

The above registered patent has a feature wherein a spring (800) is contracted when an inner cap (220) is combined to a container body (100), whereas the spring (800) is restored when the inner cap (220) is detached and thereby contents flow into the inside of the spuit pipe (700); as a result, it is possible to discharge a fixed amount of contents easily without additional manipulation.

However, the above registered patent has a structure wherein a spuit pipe entirely is inserted and withdrawn, so that contamination of a spuit pipe (700) by contents contained in the container body (100) is likely to arise. In addition, when contents are almost used, due to a structure wherein contents remaining on the wall of the container body (100) are hard to suck in, a problem that a large amount of residual in the container remains still stays unsolved.

In addition, since it has a structure, wherein a button part (400) is restored by a spring (800) after contents being used, the structure should be very complicated so as to suck back contents into the inside of the spuit pipe (700) after contents being used; it is necessary to combine an inner cap (200) and move a button part (400) to a downward direction and then move the button part (400) to a upward direction when detaching the inner cap (200).

SUMMARY OF THE DISCLOSURE

The present disclosure is devised to solve the said problems in the above, and its goal is to provide a fixed quantity discharge device for a liquid container which includes a contents suction tube extended into the inside of the container body for enabling a spuit pipe be inserted and withdrawn so as to make the lower end of the spuit pipe exposed to the contents, thus preventing contamination of the spuit pipe, and a piston provided in the container body so as to ascend as the contents are consumed, thus minimizing the residual contents in the container body.

Furthermore, it is to provide a fixed quantity discharge device for a liquid container, wherein by installing a structure, a button ascends along a guide part formed at an inner cap when a spuit part is combined to a coupling part and sucks and discharges contents contained in the container body into a spuit pipe, and thereby it is possible to discharge contents by means of the simple structure without a spring installed.

To solve the above problems, a fixed quantity discharge device for a liquid container according to the present disclosure comprises a container body where contents are contained; a spuit part which is combined so as to be detached from the container body; and a spuit pipe which sucks and discharges a fixed amount of contents contained in the container body, wherein the fixed quantity discharge device for a liquid container comprises: a support body which is combined encircling an upper portion of the container body, further comprising a coupling part wherein the spuit pipe is combined and a contents suction tube which is extended into the interior of the container body for enabling a spuit pipe to be inserted and withdrawn, comprising a contents inflow hole at an lower end; a sealing member which is installed at an inner lower end of the contents suction tube and guides contents flowing in through the contents inflow hole to move only to the spuit pipe; and a piston which moves according to usage of the contents inside the container body.

Furthermore, it is featured that the spuit part comprises a spuit pipe which is inserted into the contents suction tube and sucks in contents which flow into the contents suction tube; an inner cap which is combined with a screw and forms a guide part which ascends and descends a button part at both sides of a upper end; an outer cap, combined encircling the inner cap, which rotates together with the inner cap by a user's manipulation and forms a vertical guide groove longitudinally at an inner circumferential surface so as to guide the vertical movement of a button part; a button part which ascends by rotation of the outer cap and descends by the pressurization of a user, further comprising a guide protrusion which ascends and descends along with a guide part of the inner cap.

Furthermore, in embodiments, it is featured that at a center of the inner cap is installed a pipe fixing part which is inserted to an upper portion of the spuit pipe and fixes the spuit pipe into the inner cap.

Furthermore, in embodiments, it is featured that the guide part is configured to include an ascending guide face which forms a slope in order to guide the ascent of a guide protrusion; a descending guide face which forms a slope so as to confront with the ascending guide face and guides the descent of the guide protrusion; and a securing face which is placed between the ascending guide face and the descending guide face and at which the guide protrusion arrives safely as the guide protrusion is descending.

Furthermore, in embodiments, it is featured, at an end of the ascending guide face, to form a limiting protrusion which is extended horizontally and supports the guide protrusion and limits the downward movement of a button part.

Furthermore, in embodiments, it is featured that a flange tip support rod formed with protrusion in a downward direction is equipped at a center of the inner upper end of the button part, and that at the flange tip support rod is equipped a flange tip which moves upward and downward inside a spuit pipe and sucks and discharges contents according to the pressure change inside the spuit pipe.

According to the present disclosure as described in the above, the presently described embodiments have an advantage in that a contents suction tube is extended into the interior of the container body for enabling a spuit pipe to be inserted and withdrawn so as to make the lower end of the spuit pipe be exposed to the contents, thus preventing contamination of the spuit pipe, and in that a piston is provided in the container body so as to ascend as the contents are being consumed, thus minimizing the residual contents in the container body.

Furthermore, the presently described embodiments also have an advantage in that by planning a structure which makes a button ascend along a guide part formed at an inner cap when combining a spuit part to a coupling part, it is possible to suck and discharge contents by means of a simple structure without installing a spring.

DETAILED DESCRIPTION

Hereinafter, exemplary embodiments will be described in detail with reference to the accompanying drawings. The same reference numerals provided in the drawings indicate the same members.

Figure 1:
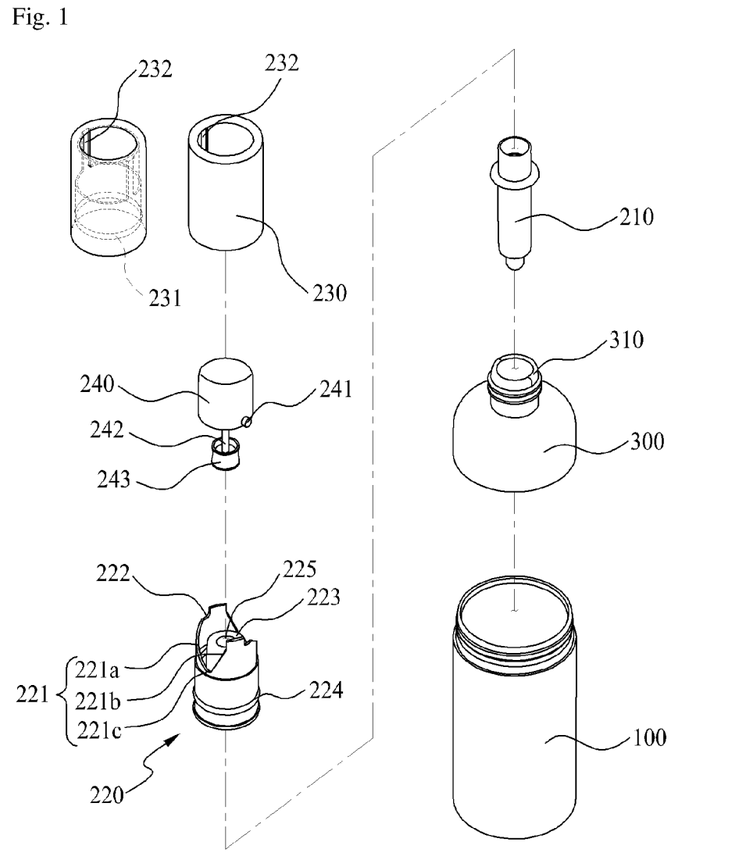
FIG. 1 is exploded perspective views illustrating a configuration of a fixed quantity discharge device for a liquid container according to an exemplary embodiment.
Figure 2:
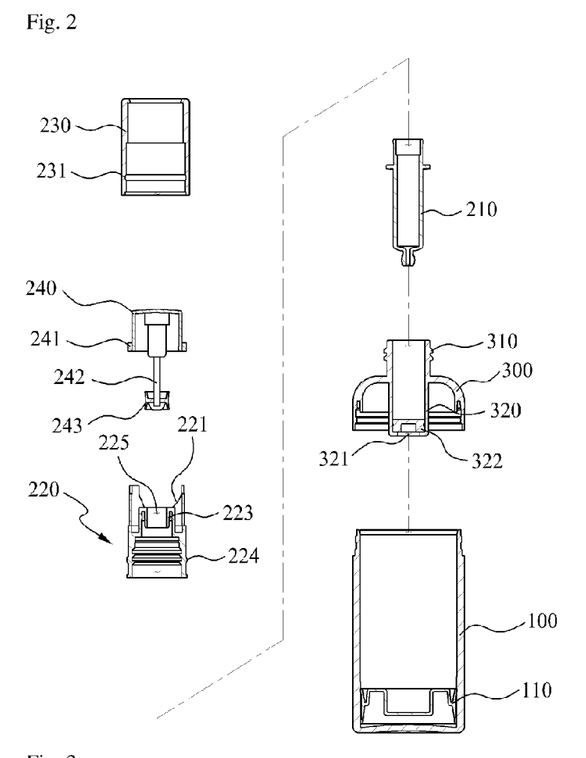
FIG. 2 is exploded cross-sectional views illustrating a configuration of a fixed quantity discharge device for a liquid container according to an exemplary embodiment.

FIG. 1 is exploded perspective views illustrating a configuration of a fixed quantity discharge device for a liquid container according to an exemplary embodiment. FIG. 2 is exploded cross-sectional views illustrating a configuration of a fixed quantity discharge device for a liquid container according to an exemplary embodiment.

Figure 3:
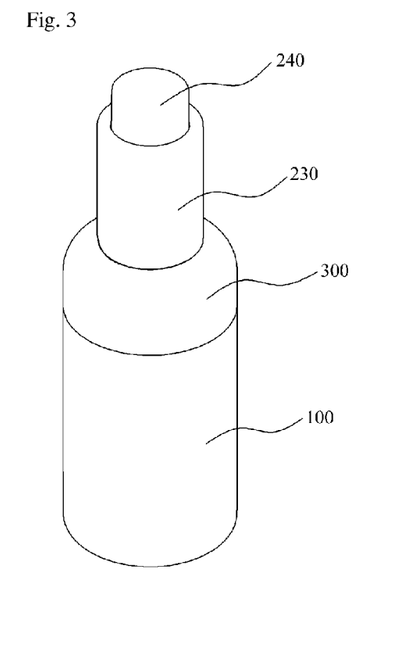
FIG. 3 is an assembled perspective view illustrating a configuration of a fixed quantity discharge device for a liquid container according to an exemplary embodiment.
Figure 4:
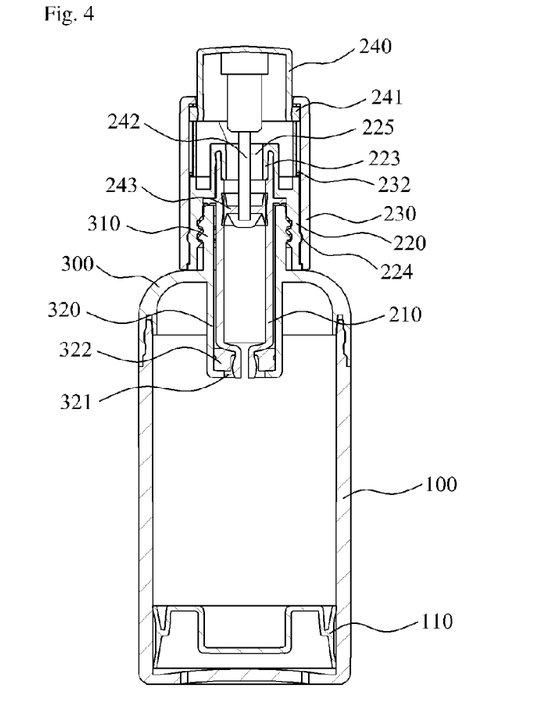
FIG. 4 is an assembled cross-sectional view illustrating a configuration of a fixed quantity discharge device for a liquid container according to an exemplary embodiment.
Figure 5:
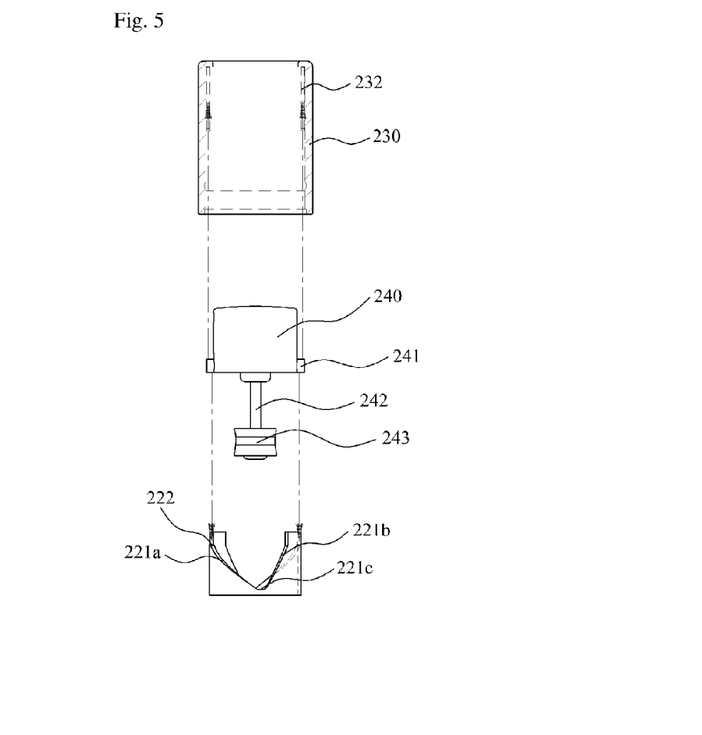
FIG. 5 is explanatory views illustrating a combining state of an inner cap, a button part, and an outer cap of a fixed quantity discharge device for a liquid container according to an exemplary embodiment.

FIG. 3 is an assembled perspective view illustrating a configuration of a fixed quantity discharge device for a liquid container according to an exemplary embodiment. FIG. 4 is an assembled cross-sectional view illustrating a configuration of a fixed quantity discharge device for a liquid container according to an exemplary embodiment. FIG. 5 is explanatory views illustrating a combination of an inner cap, a button part, and an outer cap of a fixed quantity discharge device for a liquid container according to an exemplary embodiment.

Referring to FIGS. 1 to 7, a fixed quantity discharge device for a liquid container according to an exemplary embodiment of includes a container body 100, a spuit part 200, and a support part 300.

The container body 100, where contents are contained, comprises a piston 110 which ascends according to usage of contents at an inner side. As to the present invention, it is featured that a piston 110 is provided at the interior of the container body 100, thereby minimizing the contents which remains on an inner wall of the container body 100.

The spuit part 200, which is combined so as to be detached from the container body 100, and sucks and discharges a fixed amount of contents contained in the container body 100, includes a spuit pipe 210, an inner cap 220, an outer cap 230, and a button part 240.

The spuit part 210, forming its lower end opened and sucking contents flowing into a contents suction tube 320 that will be described later, is inserted into the contents suction tube 320 when combining a spuit pipe 200 into the container body 100, and then sucks and stores contents flowing into the contents suction tube 320 through a contents inflow hole 321. The spuit part 210 sucks and discharges contents from the contents suction tube 320 when the spuit part 200 is detached from the container body 100, and thereby contents kept by pressurization of a button part 240 is discharged to the exterior.

A lower end of the spuit pipe 210 is coupled with a sealing member 322 which is located at an inner lower end of a contents suction tube 320 when inserted into the contents suction tube 320; thereby, it is possible that contents flowing in through a contents inflow hole 321 flow only into a opened lower end of a spuit pipe 210.

The inner cap 220 is combined to a coupling part 310 of a support body 300 with screw coupling, and it is featured, as to the present invention, that a guide part 221 ascends and descends a button part 240 at both sides of the inner cap 220.

The guide part 221 comprises an ascending guide face 221a which forms a slope in order to guide the ascent of a guide protrusion 241 which will be described later; a descending guide face 221b which forms a slope so as to confront with the ascending guide face 221a and guides the descent of the guide protrusion 241; and a securing face 221c which is located between the ascending guide face 221a and the descending guide face 221b and at which the guide protrusion 241 arrives safely as the guide protrusion 241 is descending.

The guide part 221 which guides a guide protrusion 241 to move upward along the ascending guide face 221a when a rotation body 220 rotates to one side direction and ascends a button part 240, comprises a limiting protrusion 222 which is extended horizontally at the guide part 221 and supports the guide protrusion 241, thus limiting a downward movement while the button part 240 is ascending.

Furthermore, the guide part 221, while the guide protrusion 241 is being located at an upper portion of a descending guide face 221b, guides the guide protrusion 241 to move along the descending guide face 221b and thereby descends the button part 250 when the button part 250 is pressurized by a user.

On the other hand, a coupling protrusion 224, coupled to a combining groove 231 of an outer cap 230 as encircling an outer circumferential surface, is installed at a lower portion of the inner cap 220.

On the other hand, at the center of the inner cap 220 is installed a pipe fixing part 223 which fixes a spuit pipe 210 to an inner cap 220, wherein the pipe fixing part 223 is combined encircling an upper portion of the spuit pipe 210 and prevents the spuit pipe 210 from being detached from the inner cap 220 while a spuit part 200 is being detached from the coupling part 310 of the support body 300. A penetrating hole 225 is formed at a pipe fixing part 223 for enabling a flange support rod 242 to penetrate in.

The outer cap 230, which is combined encircling the inner cap 220 and rotates with the inner cap 220 by the manipulation of a user, comprises a vertical guide groove 232 longitudinally at an inner circumferential surface for guiding the vertical movement of a button part 240.

At the vertical guide groove 232 is combined a guide protrusion 241 of a button part 240, which guides a guide protrusion 241 of a button part 240 to move vertically when an outer cap 230 rotates.

On the other hand, at a lower portion of the outer cap 240 is installed a combining groove 231 which is combined with the combining protrusion 224.

The button part 240, which ascends along an ascending guide face 221a by rotation of the outer cap 240 and then descends along a descending guide face 221b, comprises a guide protrusion 241 at a side surface which moves along a guide part 221 of the inner cap 220.

The button part 240 discharges contents sucked into the interior of a spuit pipe 210 by a user's pressurization; for this, at a center of the inner upper end of the button part 240 is installed a flange tip support rod 242 which is combined with a flange tip 243 formed with protrusion in a downward direction.

At a lower portion of the flange tip support rod 242 is combined a flange tip 243; thereby, when a user presses an upper end of the button part 240, the flange tip 243 moves in a downward direction in the interior of a spuit pipe 210 by the flange tip support rod 242 and changes the pressure in the interior of the spuit pipe 210, thereby discharging contents sucked into the interior of the spuit pipe 210.

On the other hand, when a button part 240 ascends by rotation of an outer cap 230, the pressure in the interior of the spuit pipe 210 is changed by the upward movement of the flange tip support rod 242 and the flange tip 243, thereby sucking contents contained in the container body 100 into the interior of the spuit pipe 210.

A support body 300 is combined encircling an upper portion of the container body 100 and seals the interior of the container body 100, comprising a coupling part 310 which is combined with screw coupling with an inner cap 220 so as for the spuit pipe 210 to be combined.

As presently described, it is featured in some embodiments that at an inner side of a coupling part 310 is installed a contents suction tube 320 which is extended into the inside of the container body 100 for enabling a spuit pipe 210 to be inserted and drawn, wherein a contents inflow hole 321 is installed at a lower end of the contents suction tube 321 so that contents contained in the container body 100 flow in by means of spuit part 200.

On the other hand, a sealing member 322, which guides contents flowing in through the contents inflow hole 321 to move only to a spuit pipe 210, is installed at an inner lower end of the contents suction tube 320 so as to be stuck tightly on an inner circumferential surface of a contents suction tube 320, wherein the sealing member 322 is coupled encircling a lower portion of a spuit pipe 210 when a spuit pipe 210 is inserted into a contents suction tube 320, thereby preventing contents from moving into no places other than the spuit pipe 210.

Figure 6:
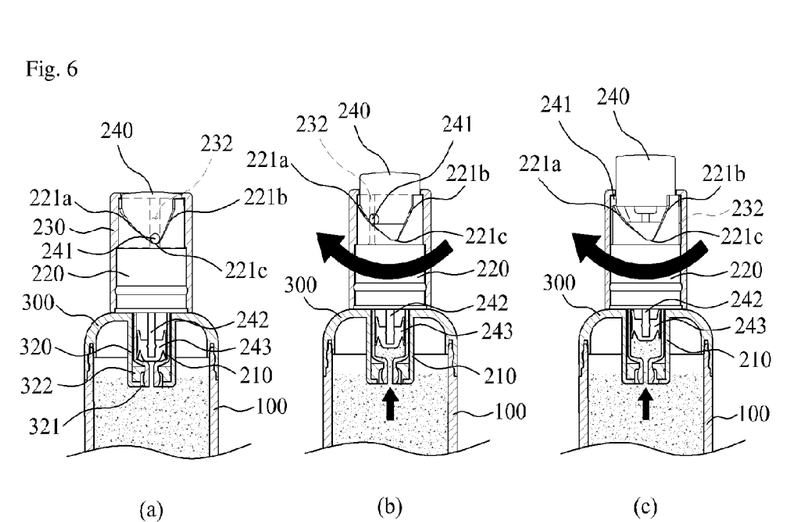
FIGS. 6 and 7 are explanatory views illustrating a contents suctioning process of a spuit part of a fixed quantity discharge device for a liquid container according to an exemplary embodiment.
Figure 7:
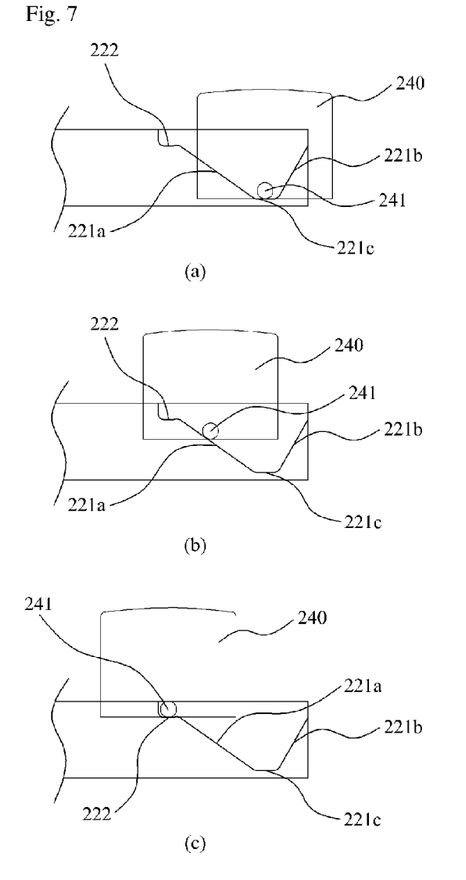
Figure 8:
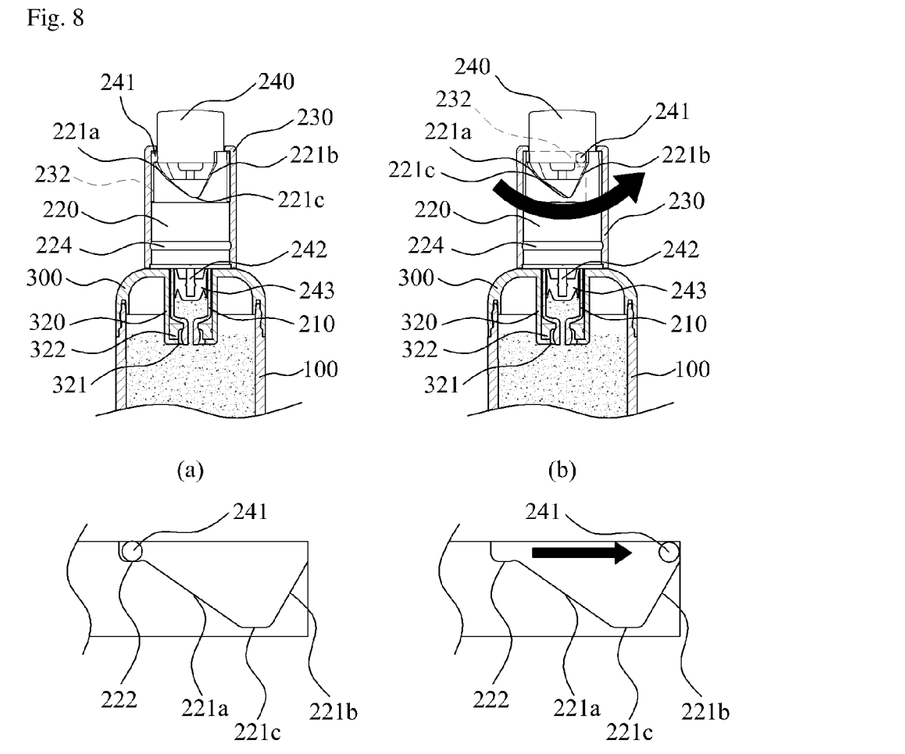
FIGS. 8 and 9 are explanatory views illustrating a discharging process of contents through a spuit pipe of a fixed quantity discharge device for a liquid container according to an exemplary embodiment.
Figure 9:
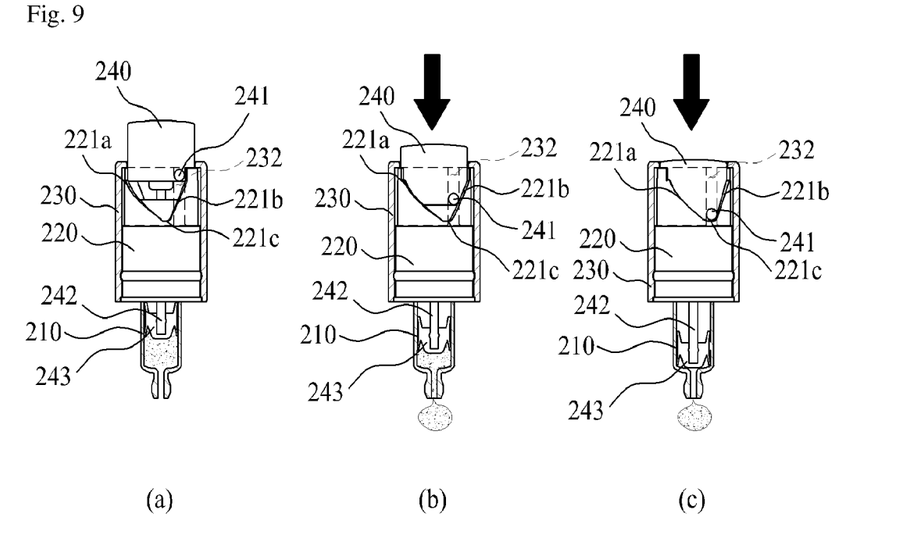

Hereinafter, referring to FIGS. from 6 to 9, the operational method of a fixed quantity discharge device for a liquid container will be described in detail. FIGS. 6 and 7 are explanatory views illustrating the contents suctioning process of a spuit part of a fixed quantity discharge device for a liquid container according to an exemplary embodiment, and FIGS. 8 and 9 are explanatory views illustrating a discharging process of contents through a spuit pipe of a fixed quantity discharge device for a liquid container according to an exemplary embodiment.

Referring to FIGS. from 6 to 9, in the operational method of a fixed quantity discharge device for a liquid container of the present invention, if a user rotates an outer cap 230 to one side direction while a guide protrusion 241 of a button part 240 is secured on a securing face 221c, an inner cap 220 is pressurized and rotated by the pressure formed by pressing the outer cap 230. As a result, the inner cap 220 is combined with screw coupling to a coupling part 310 of the support body 300.

When an inner cap 220 performs a screw coupling with a coupling part 310 completely, then the inner cap 220 is not rotated any longer and instead an outer cap 230 is rotated independently; at this time, a guide protrusion 241 of a button part 240 ascends along an ascending guide face 221a formed at the inner cap 220, and thereby the button part 240 ascends.

Next, when a button part 240 ascends, a flange tip 243 combined to a lower portion of a flange tip support rod 242 of the button part, and as the flange tip 243 ascends, contents flow into a contents suction tube 320 through a contents inflow hole 321 by inner pressure of a spuit pipe 210 caused as a flange tip 243 is ascending; thereby, contents which flows in through a contents inflow hole 321 by a sealing member 322 installed at a contents suction tube 320 is sucked only into the interior of a spuit pipe 210. At this time, a guide protrusion 241 of a button part 240 is configured to be secured at a limiting protrusion 222, thereby making the button part 240 not pressurized in a downward direction.

As the above, an outer cap 230 is rotated to the other side direction for detaching a spuit part 200 from a coupling part 310 so as to use contents while contents is being discharged into the interior of a spuit pipe 220. If the outer cap 230 is rotated into the other side direction, firstly the outer cap 230 can be rotated independently and then when a guide protrusion 240 meets directly an inner wall of the guide part 221 which is located on a top dead point of a descending guide face 221b, an inner cap 220 can be rotated along with an outer cap 230 by pressurization of the guide part 221 by a guide protrusion 240. As a result, the inner cap 220 is released from a screw coupling from the coupling part 310, and thereby, the spuit part 200 is detached from the coupling part 310.

As the above, when a button part 240 is pressurized while a spuit part 200 is being detached from a coupling part 310, a guide protrusion 241 of a button part 240 gets to pressurize a descending guide face 221b of an inner cap 220 and thereby performs the rotation of the inner cap 220 and then leads the guide protrusion 241 to descend along the descending guide face 221b, resulting in the descent of the button part 240.

When the button part 240 descends, a flange tip 243 combined at a lower portion of the button part 240 descends together, resulting in discharging contents sucked in a contents suction tube 320.

If discharging contents is performed through the process as the above, a guide protrusion 241 becomes in a state of being secured at a securing face 221c; in this state, when rotating an outer cap 230 to one side direction and combines to a coupling part 310 of an inner cap 220 with screw coupling, a guide protrusion 241 move to an upper portion riding over an ascending guide protrusion 221a and ascends the button part 240, thereby automatically leading contents to be sucked into an interior of the spuit pipe 210.

Namely, by simple manipulation wherein rotating an outer cap 230 into one direction and combining the inner cap 220 to a coupling part 310, it is possible to withdraw contents to the interior of the spuit pipe 210 for the next use.

As described above, embodiments have been disclosed in the drawings and the specification. Although specific terms have been used herein, these are only intended to describe various embodiments and are not intended to limit the meanings of the terms or to restrict the scope of the accompanying claims. Therefore, those skilled in the art will appreciate that various modifications and other equivalent embodiments are possible from the above embodiments.

What is claimed is:

1. A fixed quantity discharge device for a liquid container comprising:
    a container body wherein contents are kept; and
    a spuit part combined to be able to be detached from the container body, further comprising a spuit pipe which sucks and discharges a fixed amount of the contents contained in the container body, the spuit part further including an inner cap, an outer cap, and a button part;
    the inner cap combined with a screw coupling, the inner cap including a guide part which is configured to ascend and descend the button part;
    the outer cap combined encircling and rotating with the inner cap, the outer cap having a vertical guide groove formed longitudinally at an inner circumferential surface to guide a vertical movement of the button part;
    the button part including a guide protrusion which is configured to ascend and descend along the guide part of the inner cap, the button part being configured to ascend responsive to rotation of the outer cap and descend responsive to user pressurization;
    wherein the fixed quantity discharge device for a liquid container comprises:
        a support body combined encircling an upper portion of the container body, further comprising:
            a coupling part wherein the spuit pipe is combined and a contents suction tube which is extended into the interior of the container body for enabling the spuit pipe to be inserted and withdrawn, comprising a contents inflow hole at an lower end;
            a sealing member which is installed at an inner lower end of the contents suction tube and guides the contents flowing in through the contents inflow hole to move only to the spuit pipe; and
            a piston which moves according to usage of the content inside the container body; and
        wherein the spuit pipe is inserted and withdrawn in the contents suction tube and configured to suck and discharge contents which flow into the contents suction tube.

2. The fixed quantity discharge device for a liquid container of claim 1, comprising a pipe fixture which is inserted at a center of the inner cap and fixes the spuit pipe to the inner cap.

3. The fixed quantity discharge device for a liquid container of claim 1, comprising:
    an ascending guide face which forms a slope in order to guide the ascent of the guide protrusion;
    a descending guide face which forms a slope so as to confront with the ascending guide face and guides the descent of the guide protrusion; and
    a securing face which is placed between the ascending guide face and the descending guide face and at which the guide protrusion arrives safely as the guide protrusion is descending.

4. The fixed quantity discharge device for a liquid container of claim 1, comprising a limiting protrusion which is extended horizontally at the guide part; and supports a guide protrusion, thus limiting a downward movement while the button part is ascending.

5. The fixed quantity discharge device for a liquid container of claim 3, comprising a flange tip support rod which is formed with protrusion at a center of an inner upper portion of the button part, wherein at the flange tip support rod is combined a flange tip, which sucks or discharges contents according to the pressure change in an interior of a spuit pipe as moving upwards and downwards in a spuit pipe.

* * * * *